(12) United States Patent
Drewery

(10) Patent No.: US 6,224,752 B1
(45) Date of Patent: May 1, 2001

(54) WASTEWATER TREATMENT SYSTEM WITH OPERATIONS CONTROL CENTER

(75) Inventor: T. Gig Drewery, Kountze, TX (US)

(73) Assignee: Aqua Partners, Ltd., Lumberton, TX (US)

( * ) Notice: Subject to any disclaimer, the term of this patent is extended or adjusted under 35 U.S.C. 154(b) by 0 days.

(21) Appl. No.: 09/298,504

(22) Filed: Apr. 23, 1999

Related U.S. Application Data

(63) Continuation-in-part of application No. 09/151,327, filed on Sep. 11, 1998, now Pat. No. 6,106,704.

(51) Int. Cl.⁷ .................................................. B01D 33/70
(52) U.S. Cl. ............................. 210/86; 210/97; 210/150; 210/195.1; 210/205; 210/207; 210/220; 210/258; 210/259; 210/151; 439/462; 285/151.1
(58) Field of Search ................................ 261/122.1, 123; 210/97, 86, 123, 150, 151, 195.1, 207, 220, 221.2, 257.1, 258, 126, 259, 198.1, 205, 248; 439/462; 285/151.1, 149.1; 410/39, 42

(56) References Cited

U.S. PATENT DOCUMENTS

| | | | |
|---|---|---|---|
| 3,438,499 | * | 4/1969 | Reckers . |
| 3,567,843 | * | 3/1971 | Collins . |
| 3,681,236 | * | 8/1972 | Bergles et al. . |
| 4,211,655 | * | 7/1980 | Jordan . |
| 4,246,144 | * | 1/1981 | Krebs et al. . |
| 4,314,969 | * | 2/1982 | Arthur et al. . |
| 4,339,231 | * | 7/1982 | Conery et al. . |
| 4,867,871 | * | 9/1989 | Bowne . |
| 5,614,086 | * | 3/1997 | Hill et al. . |
| 5,614,098 | * | 3/1997 | Shao et al. . |
| 5,720,875 | * | 2/1998 | Stegall, Sr. et al. . |
| 5,735,412 | * | 4/1998 | Sheckells . |

* cited by examiner

Primary Examiner—W. L. Walker
Assistant Examiner—Terry K. Cecil
(74) Attorney, Agent, or Firm—Harrison & Egbert

(57) ABSTRACT

A wastewater treatment system having an aeration tank (20) is provided with an operations control center (12) that includes a controller (64) and an aerator pump (50) mounted atop a base (58), which is in turn mounted atop a platform (56). A plurality of electrical lines (66) extend from the controller through respective conduits (90, 92, 94, 96). The conduits extend through and are sealingly engaged by holes in the base and the platform. A compression fitting (136) and coupler (154) are included to provide a fluid-tight seal. This arrangement is advantageous because it prevents corrosive gases from entering the operations control center and corroding the terminals thereof. Also described is a wastewater treatment system that includes a pretreatment tank (244), an aeration tank (20), and a pump tank (202) secured together by a connector that includes bands (260, 262) and spacing means (264, 268) for maintaining a fixed-spaced relationship between the tanks.

13 Claims, 7 Drawing Sheets

WASTEWATER TREATMENT SYSTEM WITH OPERATIONS CONTROL CENTER

RELATED APPLICATIONS

The present application is a continuation-in-part of U.S. Application Ser. No. 09/151,327, now U.S. Pat. No. 6,106,704, filed on Sep. 11, 1998, and entitled "Wastewater Treatment System with Air Pump/Control Panel Platform", presently pending.

TECHNICAL FIELD

The present invention relates to wastewater treatment systems. More particularly, the present invention related to wastewater treatment systems which utilize an aeration tank. Furthermore, the present invention related to wastewater treatment systems having electrical connections extending to switches within the tanks and extending to a pump. Furthermore, the present invention relates to wastewater treatment systems which include junction boxes for the connection of various electrical lines within the interior of the tanks.

BACKGROUND ART

Recently, home wastewater treatment systems have become increasingly popular. Prior to the development of home wastewater treatment systems, septic tanks were the conventional manner of cleaning home and small commercial establishment wastes from the water. In view of the great cost associated with connecting a home sewage system with the city sewage system, it is economically beneficial to employ the use of home wastewater treatment systems. Present home wastewater treatment systems are a down-sized, underground version of the treatment processes employed by large central treatment plants.

Essentially, the treatment process correlates with an example found in nature. When a creek runs through rocks and over logs, turbulence is created and oxygen is captured. Aerobic bacteria utilize oxygen in their digestion processes. This allows the creek to purify itself. The home wastewater treatment systems simply employ a speeded-up version of this process in a manner known as "extended aeration". Air or oxygen is brought in by means of an efficient air pump and then diffused into thousands of tiny air bubbles by means of fine air diffusion. As these tiny bubbles move upward through the wastewater, oxygen is captured and the same purification process takes place. Such a system can allow normal household waste water to be reduced to a clear odorless liquid.

One such system has been manufactured and sold by Hydro-Action, Inc. of P.O. Box 12583, Beaumont, Tex. The system is known as the HYDRO-ACTION™ system. It is a self-contained automatic system. The HYDRO-ACTION™ system incorporates two separate compartments, each performing a specific function in the digestion process. First, raw waste water enters the aeration compartment and is mixed with activated sludge and aerated. An air pump injects large quantities of air into this compartment by means of porous ceramic diffusers located above the bottom perimeter of the aeration compartment. These diffusers create thousands of tiny air bubbles which provide oxygen for the aerobic digestion process and mixes the compartment's entire contents. These tiny bubbles provide better air-to-liquid contact so as to hasten the aerobic digestion process. Aerobic bacteria then use the oxygen in solution to break down the wastewater so as to convert the wastewater into an odorless liquid and gas. Hydraulic displacement causes the mixture to enter the second and final compartment. Due to the calm conditions and sloping walls of the clarification compartment, any remaining settleable material is encouraged to return to the aeration compartment for further treatment. The remaining effluent, upon reaching the outlet piping, is clear and odorless.

This HYDRO-ACTION™ system allows homes to be built on clay soil, rock or high water tables. This system also helps to protect the ground water supplies and eliminates gross pollution of ditches and streams. The effluent discharged from such a system is allowed by some state and local regulatory agencies to be discharged directly to a stream or pond or used to surface irrigate lawns and pastures. In areas where surface discharge is not allowed, subsurface disposal methods can be used with good success.

Conventionally, in such extended aeration treatment systems, a control panel is connected to the wastewater treatment system so as to control and monitor the conditions within the treatment tank. An air pump is also used so as to supply air to the aerators and diffusers within the aeration compartment of the tank. The control panel is typically electrically connected to the air pump so as to monitor the pressure delivered by the air pump. In conventional practice, a wastewater treatment tank will be buried in the earth a suitable distance away from a home or a commercial establishment. Since these wastewater treatment tanks are relatively large (at least 500 gallons capacity), a significant hole must be formed in the earth so as to accommodate the wastewater treatment system. After the wastewater treatment system is installed into the earth, only the cover of the access opening of the tank will be exposed above the earth. In normal practice, the control panel will be placed onto a wall of the home or commercial establishment or upon a pedestal. The air pump will be placed in a location generally adjacent to the wall of the commercial establishment or home. So as to allow the electrical lines from the control panel to reach the tank, it is necessary to trench the earth so as to allow conduits to extend from the home or commercial establishment to the tank. Similarly, trenching must be carried out in the earth so as to allow the air lines from the air pump to pass to the treatment tank. Additional trenching may be required so as to allow the electrical lines from the control panel to be connected to the air pump.

This process of trenching the earth is a very time consuming and tedious process. Many homeowners are reluctant to allow such trenching to occur. Typically, the installers of such extended aeration wastewater treatment systems will take shortcuts in the installation of the electrical conduits and air lines. Under certain circumstances, these lines will cross in the earth. In other circumstances, separate trenches will not be formed for the electrical lines and for the air lines. Instead, the installer of the extended aeration wastewater treatment system will simply attempt to place the air lines and the electrical lines together in a single trench. This practice is improper since the crossing of the air lines and the electrical lines can pinch the air lines so as to reduce air flow to the aeration system. Furthermore, when the electrical lines and the air lines are installed in this manner, any settling of the earth will cause the air line to become pinched.

Normally, the air pump must be placed on a graded surface. As such, the installer must grade a section of the earth so as to allow for the placement of the air pump on a level surface. Under certain circumstances, the air pump will be placed upon a concrete base so as to be properly supported in a desired position above the earth. The installation of the air pump and the construction of the base for the air pump takes a great deal of time during the installation of such aerobic wastewater treatment systems.

When the control panel is installed onto the wall of the house, it is necessary for the installer to drill holes in the wall of the house and to position the control panel in a desired location. Under certain circumstances, the homeowner may not wish to have a control panel placed on the wall of the house. Under other circumstances, the placement of the control panel on the wall of the house is in a difficult to reach or otherwise undesirable location. In any event, a great deal of labor is required to properly place the control panel on the house.

In the installation of the control panel and the air pump, the installer is required to have a suitable level of knowledge of electrical circuitry. This knowledge is required so as to allow the installer to properly connect the electrical line to the air pump components and to the treatment tank components. Wires must be extended over a great deal of distance within conduits so as to allow the proper electrical connections to be made. If an improper electrical connection is made, then the aerobic wastewater treatment system will not function in the desired manner. In other circumstances, short circuits can occur if the electrical lines are not installed properly. It has been found that the typical installer of such aerobic wastewater treatment systems lacks sufficient knowledge in electrical circuitry to effectively install the wastewater treatment system. Under certain circumstances, electricians must be called in so as to complete the connections.

Whenever it is necessary to service such extended aeration wastewater treatment systems, the person carrying out the service must move back and forth between the control panel, the air pump and the tank so as to properly test the system. This can be a tedious task which requires several trips back and forth between the various components of the system. Under other circumstances, two persons will be required to effectively test and service the treatment tank. For example, it is often necessary to have one person stationed by the air pump while the other person is inspecting the interior of the treatment tank. In other circumstances, one person must be stationed by the control panel while the other person is stationed by the treatment tank. The arrangement of the air pump, the control panel and the treatment tank in conventional systems greatly complicates the ability to properly service the treatment tank.

In certain circumstances, a pump tank is connected to the treatment tank of the extended aeration system. The pump tank is used so as to receive water from the treatment tank and to allow the liquid from the treatment tank to be pumped for irrigation or other disposal purposes. The pump tank has a liquid pump located within the interior of the tank. Whenever a pump tank is used, it is necessary to further trench the earth so as to allow for the installation of the electrical power supply line to reach the pump tank. Normally, this requires a conduit to be installed in the earth for the distance from the control panel to the pump tank. Typically, several electrical lines must extend from the control panel to the pump tank. The installation of the pump tank greatly complicates the ability to install the wastewater treatment system. Additionally, further electrical knowledge is required so as to effectively connect the various leads of the electrical lines to the pump tank with the connectors from the control panel.

In the past, it has been difficult to consider the placement of an air pump and a control panel on the top of the treatment tank. Typically, the treatment tank will have a curved top surface which extends over the cylindrical tank. A very large access opening is placed centrally of the top of the tank. This access opening allows access to the interior of the tank. Conventionally, the access opening will open so as to allow a person to inspect the interior of the clarifier compartment. However, the access opening generally makes it difficult to inspect the interior of the aeration compartment. There is very little space on the top of the tank beyond the area of the access opening. As such, there is insufficient space on the top of the tank to accommodate an arrangement of the air pump and the control panel.

One technique for the placement of the aerator assemblies within such extended aeration systems has been to place a first aerator on one side of the clarifier compartment and a second aerator on the opposite side of the clarifier compartment. Under circumstances where the access opening is placed centrally of the top of the tank, it becomes a very difficult problem to access such aerator assemblies for inspection and repair. Since the aerator assemblies are placed in inconvenient locations within the tank, the maintenance or repair personnel must reach deeply into the tank so as to "thread" the aerator conduit through openings formed in the clarifier compartment. This is a very difficult, time consuming and tedious process. In the past, it has been desirable to make the access opening as large as possible so as to facilitate the ability to inspect and repair the aerator assemblies. However, in contrast, the homeowner prefers not to have large "monuments" extending outwardly of the earth near his or her home. As such, a need has developed so as to minimize the size of such "monuments" associated with the extended aeration wastewater treatment system.

One of the problems with the electrical connections within the interior of wastewater treatment systems is the ability to electrically isolate the junction box or control panel from the liquids and gases within the interior of the wastewater treatment tank. Under certain circumstances, waterproof electrical cable extends to the various switches located within the interior of the \wastewater treatment tanks. Unfortunately, various corrosive gases will flow through the conduits supporting such waterproof cables until the terminals at the end of the electrical lines are very corroded. Once the electrical connections become corroded, it is often difficult or impossible to properly repair or reconnect the electrical lines. This corrosion effect is particularly pronounced when chlorine is used for the treatment of the wastewater.

Under other circumstances, where the junction boxes are placed on the interior of one of the \wastewater treatment tanks, an overflow condition can result in the contamination or destruction of the junction box. Whenever water flows onto the surface of the junction box, then short circuits are created by the water which remains internally within the junction box. As such, a need has developed so as to isolate the junction box or electrical control panel from the various fluids located within the interior of either the aeration tank or the pump tank of wastewater treatment systems.

Under certain circumstances, the homeowner will prefer to have the electrical controller (or "control center") located within a housing placed on top of the aeration tank of the wastewater treatment system. In such an arrangement, the number of monuments in the homeowner's yard are minimized and access to the control center is facilitated. In the configuration of the present invention, as identified in prior U.S. Application Ser. No. 09/151,327, corrosive gases could flow through conduits extending to the operations control center would corrode the various terminals located within the operations control center and electrical enclosures. As such, a need developed so as to be able to isolate the equipment and terminals of the operations control center from such corrosive gases.

In other circumstances, the homeowner will desire that the operations control center be placed at a location remote from the wastewater treatment tanks. For example, the homeowner may wish the operations control center of the wastewater treatment plant be located adjacent to the home, garage or a wall of an adjacent facility. As a result, it is necessary to extend the electrical lines from the remotely located operations control center to a junction box within the wastewater treatment system. Whenever a junction box is placed on the interior of a tank, there is a possibility of fluid and/or gas contamination from either the liquid within the particular tank or from the corrosive gases within the tank. As a result, it is necessary to isolate the terminals in the operations control center from the fluids and/or gas within the tank or tank junction box.

It is an object of the present invention to provide a wastewater treatment system which conveniently places the electrical controls and/or air pump within an accessible area.

It is another object of the present invention to provide a wastewater treatment system which effectively isolates the electrical controls and/or air pump from any corrosive gases or fluids within the wastewater treatment tank.

It is a further object of the present invention to provide a wastewater treatment tank which facilitates the use of waterproof cable within the interior of the tank.

It is another object of the present invention to provide a wastewater treatment system which allows all of the electrical lines to the pump tank and from the aeration tank to be controlled from a central location.

It is a further object of the present invention to provide a wastewater treatment system which allows for the "packaging" of all of the tanks of the wastewater treatment system and the electrical, mechanical and pneumatic items of the system within a single package.

It is a further object of the present invention to provide a wastewater treatment system which facilitates access to the pump in the pump tank.

It is still another object of the present invention to provide a wastewater treatment system which allows for the use of a remotely located operations control center.

It is a further object of the present invention to provide a wastewater treatment system where the junction box associated with a remotely located operations control center is effectively maintained in a fluidically isolated environment.

These and other objects and advantages of the present invention will become apparent from a reading of the attached specification and appended claims.

SUMMARY OF THE INVENTION

The present invention is a wastewater treatment system that comprises an aeration tank having an aerator therein, an air pump connected to the aerator so as to supply air thereto, and an electrical controller electrically connected to a power supply and electrically connected to the air pump. The electrical controller has a plurality of electrical lines extending interior of the aeration tank. A plurality of the electrical lines extends outwardly of the aeration tank through a wall thereof. The electrical controller is fluidically isolated from an interior of the aeration tank.

In particular, the aeration tank of the present invention has a platform formed on a top surface thereof. The electrical controller is mounted on a base affixed to this platform. The plurality of electrical lines extend through the base of the platform. Each of the plurality of electrical lines extends through a conduit formed interior of the base. This conduit is sealingly received by an opening in the platform. Each of the plurality of electrical lines extends outwardly of a respective conduit interior of the aeration tank. The conduit has a compression fitting affixed thereto. Each of the electrical lines extends through a respective compression fitting to the electrical controller. The compression fitting is in fluid-tight relationship with an exterior surface of the respective electrical line. The conduit has a coupler having one end affixed over an end of the conduit opposite the platform. This coupler is threadedly affixed to the compression fitting.

The electrical controller includes a control box having a plurality of openings therein. The plurality of electrical lines extend through respective openings of the plurality of openings. The electrical controller also has an electrical panel mounted within the control box. The plurality of electrical lines are connected to this electrical panel. Each of the plurality of openings of the control box has a compression fitting received therein. The plurality of electrical lines extend respectively through the compression fittings of each of the plurality of openings.

In the present invention, the air pump is mounted on the base. The air pump has an air discharge line extending through an opening in the base. The platform has a hole formed therein. The air discharge line is sealingly received by this hole in the platform. The air discharge lines extend interior of the aeration tank to the aerator. A cover is removably affixed over the electrical controller and over the air pump and onto the base. The plurality of electrical lines are affixed to and extend along at least a portion of a length of the air discharge line. At least one of the plurality of electrical lines is connected to a liquid level switch within an interior of the aeration tank.

A pump tank has an inlet in fluid communication with the outlet of the aeration tank. This pump tank includes a suction pump therein. The suction pump is connected to a discharge pipe extending outwardly of the pump tank. The pump tank has a low level float switch and a high level float switch. One of the plurality of electrical lines is connected to the suction pump. Another of the plurality of electrical lines is connected to the low level float switch. Still another of the plurality of electrical lines is connected to the high level float switch. The electrical lines to the suction pump, to the high level float switch and to the low level float switch extend through a conduit affixed between the aeration tank and the pump tank. The discharge pipe has a vertical portion and a horizontal portion. The horizontal portion extends outwardly of the pump tank. This horizontal portion is detachably connected to the vertical portion. The electrical lines to the suction pump, to the high level float switch, and to the low level float switch extend along the vertical portion of the discharge pipe and are detachably affixed thereto.

In the present invention, a connector serves to secure the pump tank to the aeration tank in fixed spaced relationship. This connector includes a band which extends around a portion of the wall of the aeration tank and around a portion of a wall of the pump tank. The connector also can include a saddle member interposed between the wall of the aeration tank and a wall of the pump tank and a spacer member affixed over the outlet of the aeration tank so as to be interposed between the wall of the aeration tank and the wall of the pump tank. The present invention can also include a pretreatment tank having an outlet connected to the inlet of the aeration tank. The connector serves to secure the pretreatment tank to the aeration tank in fixed spaced relationship.

In another embodiment of the present invention, the wastewater treatment system includes an aeration tank having at least one aerator therein, a pump tank having an inlet in fluid communication with the fluid outlet of the aeration tank and having a suction pump connected to a discharge line extending outwardly of the pump tank, an air pump having an air discharge line connected to the aerator within the aeration tank, and an electrical controller electrically connected to a power supply and electrically connected to the air pump. The electrical controller includes a plurality of electrical lines extending therefrom. At least one of the electrical lines is interconnected to the suction pump within the pump tank. At least one of the plurality of electrical lines extends into the aeration tank. The electrical controller is fluidically isolated from the interior of the pump tank.

DETAILED DESCRIPTION OF THE PRESENT INVENTION

Figure 1:
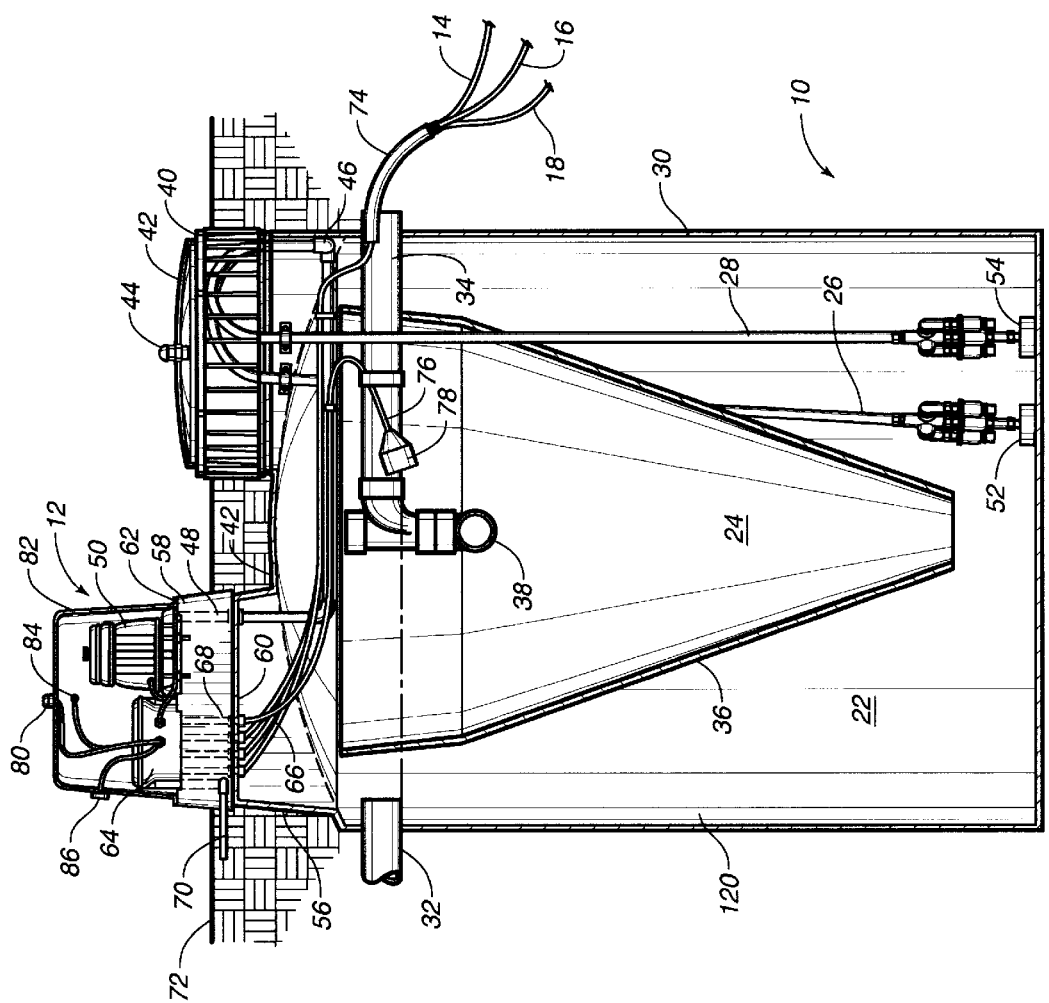
FIG. 1 is a cross-sectional view showing a simplified form of the present invention.

FIG. 1 shows the wastewater treatment system 10 in accordance with the simplified form of the present invention. The wastewater treatment system 10 incorporates an operations control center 12 in such a manner as to be attachable through the use of electrical lines 14, 16 and 18 to a separate pump tank. The wastewater treatment system 10 includes an aeration tank 20 having an aeration chamber 22 and a clarifier compartment 24. A plurality of aerators 26 and 28 extend into the aeration compartment 26 within the cylindrical walls 30 of the aeration tank 20. The aeration tank 20 includes an inlet 32 and an outlet 34.

In normal use, wastewater will enter the aeration chamber 20 through the inlet 32 from a source of wastewater or from a pretreatment tank. The aerators 26 and 28 will treat the wastewater aerobically within the aeration chamber 22. Eventually, the aerated wastewater will flow upwardly through the clarifier compartment 24. The inverted frusto-conical structure 36 of the clarifier compartment 24 will allow solids to settle out before entering the T-shaped inlet 38 extending to the outlet 34.

As can be seen in FIG. 1, the aerators 26 and 28 are connected to air lines which extend upwardly so as to be adjacent to a riser 40 located at the top 42 of the aeration tank 20. A cover 42 having a gas vent 44 extends over the riser opening 40. The tubes associated with aerators 26 and 28 will curve upwardly so as to be in proximity to the riser opening 40. These tubes will extend downwardly so as to connect with a T-shaped fitting 46. An air discharge line connects to this fitting 46 from an air pump 50 located within the control center 12. The aerators 26 and 28 are supported in their desired position through the use of weighted members 52 and 54 located on the bottom of aerators 26 and 28, respectively.

The operations control center 12 includes a platform 56 which extends upwardly from the top 42 of the aeration tank 20. A base 58 is affixed to the top 60 of the platform 56. The base 58 will have a flat top surface 62 upon which the electrical controller 64 and the pump 50 reside.

As can be seen, a plurality of electrical lines 66 extend through conduit 68 extending through the base 58. These electrical lines 66 will then connect with the electrical controller 64 in the manner to be described hereinafter. A power supply is connected to the electrical controller 68 through a conduit 70. The conduit 70 can be buried below the earth 72 so as to extend to an appropriate power supply, such as the electrical supply to the home. The electrical lines 66 extend from the electrical controller 64 along the air discharge pipe 48 and outwardly through the interior of a conduit 74 positioned adjacent to the outlet 34 of the aeration tank 20. One of the electrical lines 66 is a line 76 which connects to a float switch 78 located within the interior of the aeration tank 20. Float switch 78 will send a signal to the electrical controller 64 in the event that the level of liquid within the tank 20 exceeds a desired level.

The electrical controller 68 is connected to the air pump 50 so as to supply power thereto. The electrical controller 64 is also connected to an alarm light 80 positioned on the top of a cover 82, to a test/silence/normal switch 84 located on cover 82, and to an audible alarm 86 positioned on the cover 82. The cover 82 will extend over the electrical controller 64 and over the air pump 50. The cover 82 is secured to the top 62 of the base 58.

Figure 2:
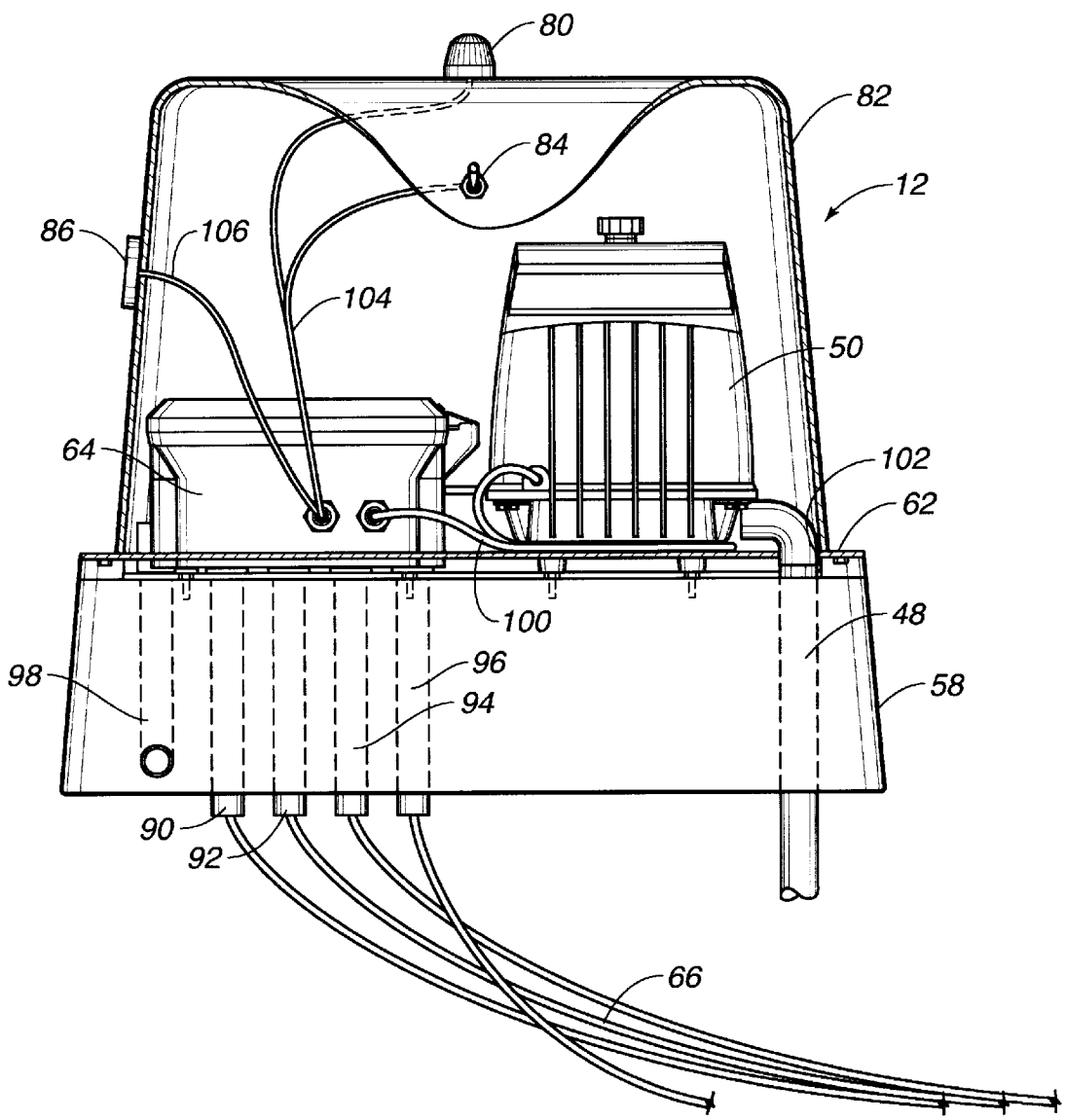
FIG. 2 is a detailed view of the operations control center as used in the preferred embodiment of the present invention.

FIG. 2 is a detailed view of the operations control center 12. In particular, in FIG. 2, it can be seen that the base 58 has a top surface 62 upon which the air pump 50 and the electrical controller 64 are mounted. Electrical lines 66 extend from the interior of the tank 20 into conduits 90, 92, 94 and 96. Conduits 90, 92, 94 and 96 extend upwardly through the interior of the base 58 and open at the top surface 62 so as to allow the electrical lines 66 to be appropriately connected to an electrical panel within the electrical controller 64. Conduit 98 will allow for the power supply line to be extended therethrough and into the electrical controller 64. A pump power line 100 extends from the electrical controller 64 to the air pump 50 so as to provide the power to the air pump 50, as required. Air discharge line 48 extends downwardly through a hole 102 in the top 62 of the base 58 and downwardly therefrom. Lines 104 and 106 allow the electrical controller 64 to be suitably connected to a warning light 80, a test/silence/normal switch 84 and to an audible siren 86. Cover 82 will extend over the air pump 50 and the electrical controller 64 so as to prevent exposure to the elements by the air pump 50 and the electrical controller 64. The cover 82 can be suitably attached to the top 62 of the base 58 so as to allow for removal when necessary.

Figure 3:
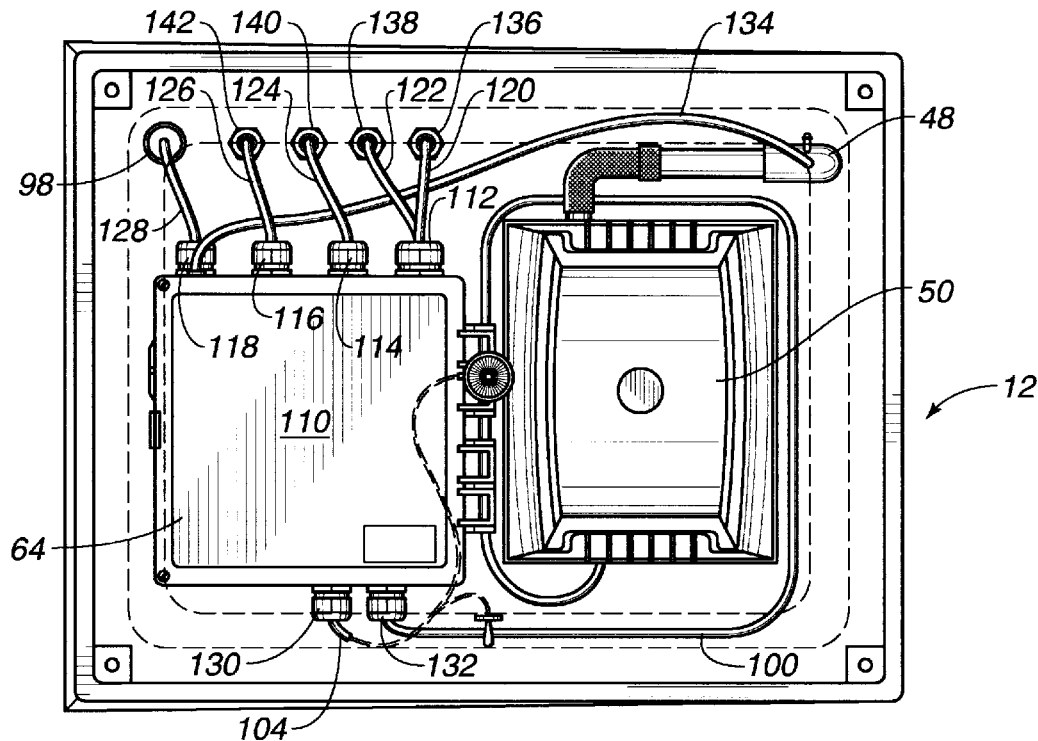
FIG. 3 is a plan view of the interior of the operations control center of the present invention.

FIG. 3 illustrates the interior of the operations control center 12. As can be seen, the electrical controller 64 includes a control box 110 with an electrical panel (not shown) mounted within the control box 110. Importantly, compression fittings 112, 114, 116 and 118 are received within openings formed on the side of the control box 110. Through the use of these compression fittings 112, 114, 116 and 118, the respective electrical lines 120, 122, 124, 126 and 128 can be received in fluid-tight relationship by the electrical panel within the interior of the control box 110. Additional compression fittings 130 and 132 are affixed on the opposite side of control box 110 so as to allow the power supply line 100 to extend to the air pump 50 and to allow the electrical line 104 to extend to the warning light 80 and to the test/silence/normal switch 84. As can be seen, the power supply line 100 to the air pump 50 is rather lengthy and loops around the air pump 50 so as to allow for easy removal and maintenance of the air pump 50. The air discharge line 48 extends from the air pump 50 so as to supply air to the aerators 26 and 28. A sampling line 134 will extend to the air discharge pipe 48 so as to monitor a pressure of air within such pipe.

In the present invention, the various "compression fittings" are known fittings which will press upon the exterior of the sheathing of electrical lines so as to establish a fluid-tight relationship between the exterior of the electrical lines and the interior surface of the compression fittings. A rotation of a nut located around an interior member of the compression fitting will establish a secure and sealing contact.

In FIG. 3, it can be seen that the electrical line 120 connects to conduit 96 through a compression fitting 136. The electrical line 122 connects to the conduit 94 through a compression fitting 138. Electrical line 124 enters the conduit 92 through the compression fitting 140. Electrical line 126 will enter the conduit 90 through the compression fitting 142. The power supply line 128 enters the conduit 98 without the compression fitting.

As can be seen in FIG. 3, the air pump 50 and the electrical controller 64 are located within the singular operations control center 12. As such, all of the important functions of the wastewater treatment system can be maintained within a single location for easy access and for full protection. The size of a monument within the user's yard is minimized by the placement of this relatively small operations control center.

Figure 4:
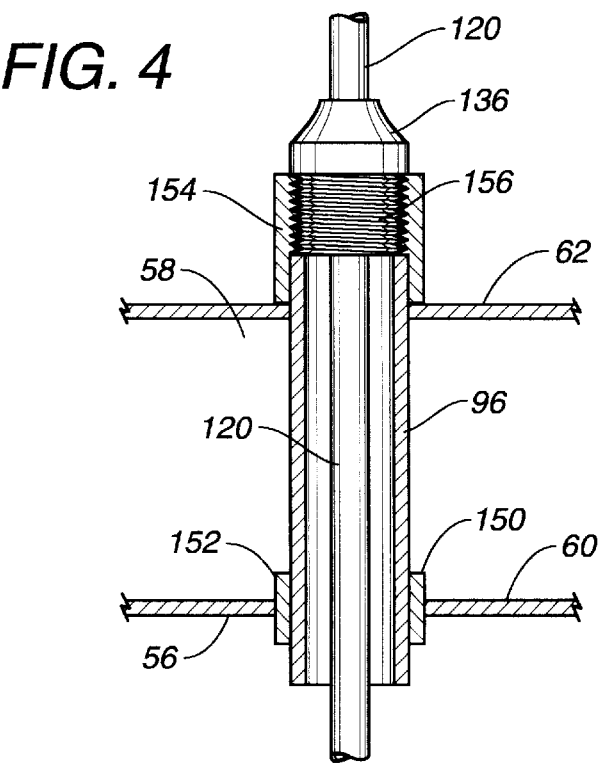
FIG. 4 is a detailed cross-sectional view showing the arrangement of compression fittings, couplers, and conduits which extend from the platform, through the base, and into the operations control center of the present invention.

FIG. 4 is a detailed view showing how an electrical line 120 is configured so as to protect the terminals on the electrical panel within the control box 110 from corrosion by the passage of gases. Initially, it can be seen that a hole 150 is formed in the top 60 of the platform 58. Various holes will be formed in this surface 60 so as to allow the various electrical lines to extend therethrough. An elastomeric seal 152 is placed within the hole 150. The conduit 96 is then placed through the interior of the annular seal 152 so as to extend upwardly through the interior of the base 58. The electrical line 120 will similarly extend through the interior of the conduit 96. The conduit 96 can be a flexible or a rigid conduit that has a suitable length so as to extend from below the top surface 60 of the platform 56 to above the top surface 62 of the base 58. A coupler 154 has a female end which receives the upper end of the conduit 96. The female lower end of the coupler 154 can be secured to the conduit 96 by various means, such as by adhesives or by threads. The coupler 154 also includes a threaded portion 156 which threadedly receives the compression fitting 136. The compression line 120 is illustrated as extending outwardly of the compression fitting 136. The electrical fitting 136 will be in fluid-tight relationship therewith.

In the prior art, there was a problem that the corrosive gases from the interior of the wastewater treatment system would flow through conduits, such as conduit 96, and upwardly along the passageway of the electrical line so as to eventually emerge at the area of the terminal/connection of the electrical line with the electrical panel. This corrosive gas would tend to corrode the terminals in the electrical box 110. The present invention eliminates this problem by effectively sealing the migration of gases along the electrical line 120 and within the conduit 96. This is accomplished in a doubly protective manner. The compression fitting 136 initially serves to prevent such migration of gases from entering the interior of the operations control center 12. The compression fitting 112 on the control box 110 will further serve to prevent any corrosive gases, or liquids, from entering the control box 110 and from affecting the terminals on the electrical panel within the control box 110. Also, if any dampness or water from the environment exterior of the cover 82 should enter the cover 82, the various compression fittings will serve to prevent damaging migration of such liquids and gases.

Figure 5:
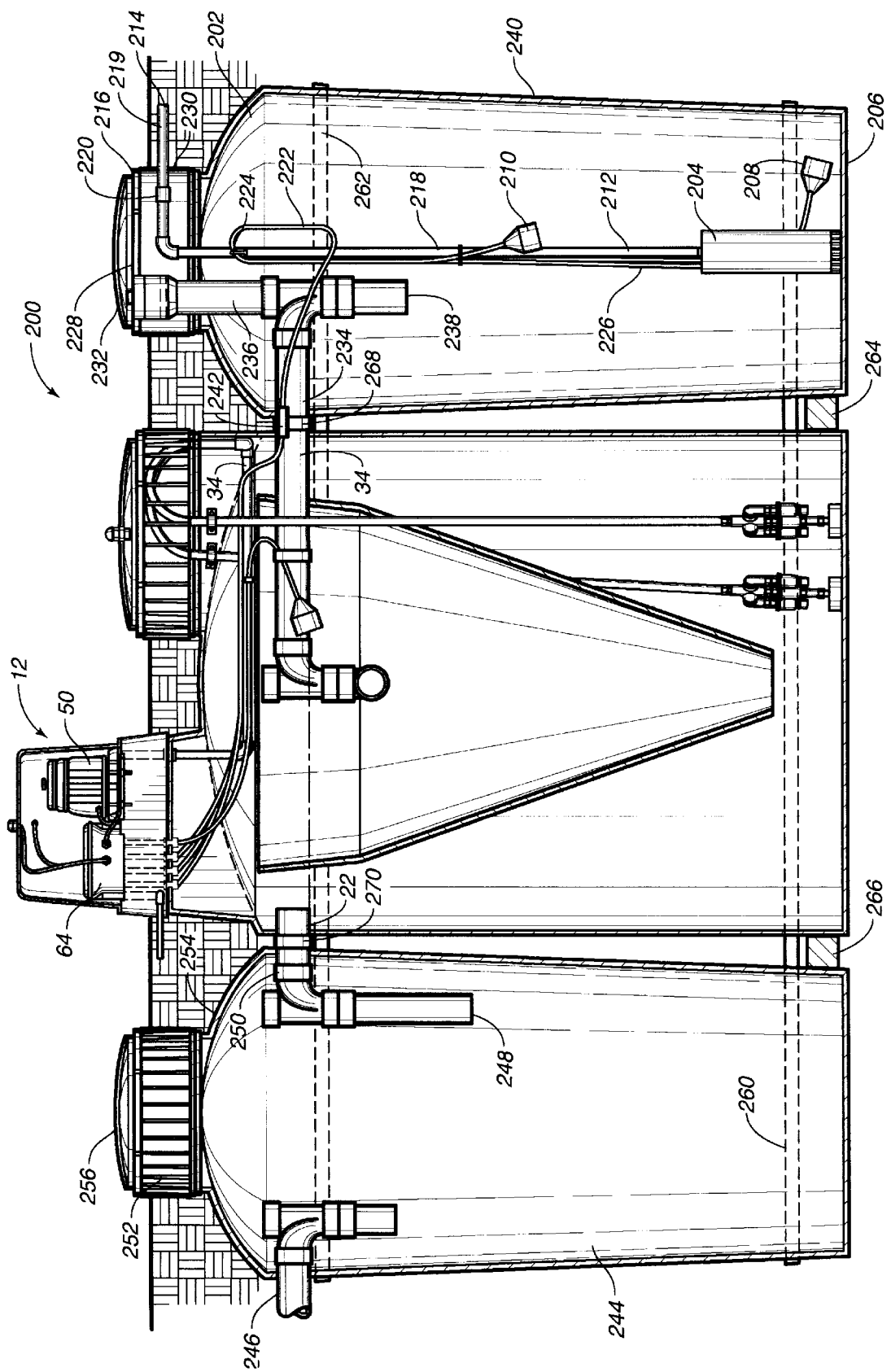
FIG. 5 is a cross-sectional view showing the arrangement of the preferred embodiment of the present invention.

FIG. 5 illustrates the present invention as used in conjunction with a wastewater treatment system 200. Unlike the simplified embodiment of the wastewater treatment system 10, as shown in FIG. 1, the wastewater treatment system 200 includes a pump tank 202. The pump tank 202 includes a suction pump 204 located at the bottom 206 of the pump tank 202. A low level float switch 208 is positioned adjacent to the bottom of the suction pump 204 so as to prevent the pump 204 from pumping dry. A high level float switch 210 is positioned at a desired level within the interior of the pump tank 202. The suction pump 204 serves to pass liquid from the bottom of the pump tank 202 through the discharge pipe 212. The discharge pipe 212 has an outlet 214 extending outwardly of the top 216 of the pump tank 202. The discharge pipe 212 includes a vertical portion 218 and a horizontal portion 219. A union 220 detachably connects the vertical portion 218 with the horizontal portion 219. The union 220 serves to promote the disassembly of the discharge pipe 212 so as to allow for the removal of the suction pump 204 for maintenance and repair.

In FIG. 5, it can be seen that an electrical line 222 loops around a hook 224 on the vertical portion 218 of discharge pipe 202. This electrical line 222 will extend downwardly so as to connect with the high level float switch 210. Another electrical line 226 will extend along the vertical portion 218 of discharge pipe 212 so as to connect with the low level float switch 208. As can be seen, if it is desired to repair the suction pump 204 and its associated components, the union 220 between the horizontal portion 219 and the vertical portion 218 of discharge pipe 212 can be disconnected. The vertical portion 218 can be pulled upwardly so that the suction pump 204 can be removed from the opening 228 at the top of riser 230 on the pump tank 202. The cover 232 can be suitably removed so as to expose the open interior of the pump tank 202. When the vertical portion 218 has been lifted a for a desired distance, the electrical line 222 can be removed from its hook 224 so as to allow the suction pump 204 to be completely removed.

It can be seen in FIG. 5 that the pump tank 202 has an inlet 234 which is connected to the outlet 34 of the aeration tank 20. The inlet 234 is in fluid communication with a chlorinator device 236 so as to mix with the chlorine in the chlorinator 236 prior to discharge through the outlet 238 of the chlorinator apparatus 236. If necessary, a chlorinator alarm can also have an electrical line connected thereto and extend to the electrical controller of the present invention.

As can be seen, electrical lines 222 and 226 will extend along the inlet 234 and outwardly of a wall 240 of the pump tank 202 through a conduit 242. The electrical lines will then extend upwardly so as to extend along air discharge pipe 48 connected to air pump 50. These electrical lines will then extend, in the manner described herein previously in association with FIG. 1, to the electrical controller 64 in the operations control center 12.

In FIG. 5, it can be seen that there is a pretreatment tank 244 which is connected to the inlet 22 of the aeration tank 20. In particular, the pretreatment tank 244 has an inlet 246 which will connect to a source of sewage. Sewage will flow through the inlet 246 to be discharged into the interior of the pretreatment tank 244. Eventually, by fluid displacement, and by gravity, the solids will settle and fluid will pass into the opening 248 at the outlet pipe 250 of the pretreatment tank 244. A riser 252 is connected to the top 254 of the pretreatment tank 244. A cover 256 extends over the opening of riser 252 so as to close the interior of the pretreatment tank 244.

In FIG. 5, it can be seen that the wastewater treatment system 200 is suitable for sale and installation as a single unit. This is accomplished through the use of the connector members 260 and 262. Connectors 260 and 262 are bands which extend around the exterior surfaces of each of the tanks 20, 202 and 244. The bands 260 and 262 compressively engage the outer surface of each of these tanks so as to draw the tanks together. A proper spacing between the tanks is achieved through the use of saddle members 264 and 266. Saddle member 264 is positioned adjacent to the bottom 206 of the pump tank 202 between the aeration tank 20 and the pump tank 202. Saddle member 264 serves to prevent any damage between the walls of the particular tanks by suitably spacing the walls apart from one another. A spacer 268 is positioned around the inlet 234 of the pump tank 202. Spacer member 242 serves to create a proper spacing between the wall of the pump tank 202 and the wall of the aeration tank 20. The saddle member 266 is positioned so as to properly space the aeration tank 20 from the pretreatment tank 244. Another spacer member 270 is positioned on the inlet 22 of the aeration tank 20 so as to properly space the upper side of the pretreatment tank 244 from the upper side of the aeration tank 20. As such, the bands 260 and 262, in combination with the saddle members 264 and 266, along with the spacer members 268 and 270, space the tanks from each other in a fixed unconnected manner.

In normal use, the wastewater treatment system 200 can be delivered to a customer as a single assembled and connected unit. For installation, only a single excavation is required. Since all of the electrical and fluidic components of the wastewater treatment system 200 are already connected together, it is only necessary to provide the power supply to the operations control center 20, to connect the inlet 246 to a source of sewage, and to extend the discharge line outlet to a desired location. The present invention greatly simplifies the installation of the wastewatertreatment system 200 and minimizes the amount of labor required for installation. As such, the present invention presents an enormous savings to the ultimate user and to the installer. All of the components, both fluidic and electrical, can be connected together by the manufacturer and properly tested prior to installation. Installation errors are effectively minimized.

Figure 6:
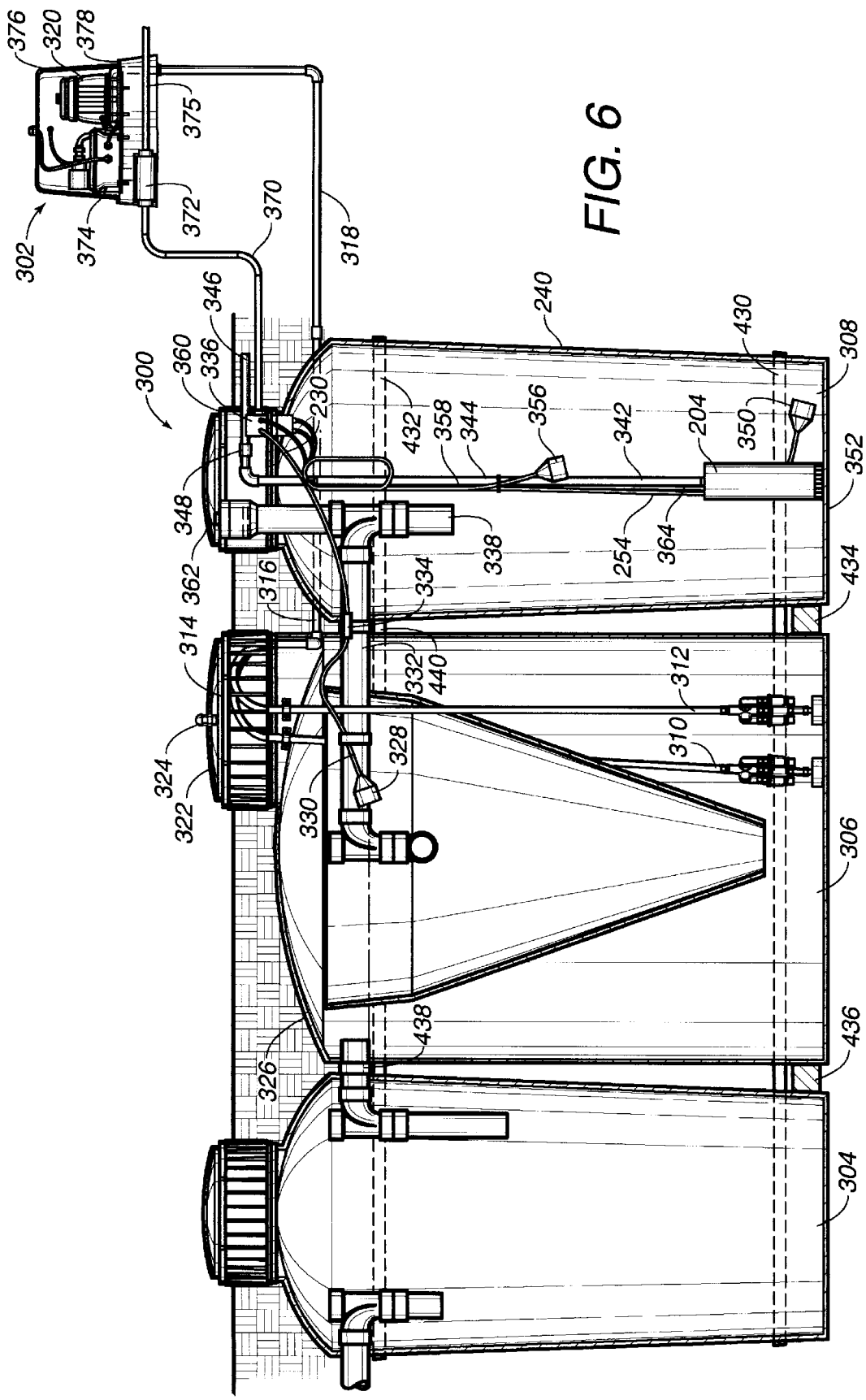
FIG. 6 is a cross-sectional view showing an alternative embodiment of the present invention with the operations control center at a remote location.

FIG. 6 shows an alternative embodiment of the present invention. Under certain circumstances, the user of the wastewater treatment system 300 may desire that the control center 302 be located at a location remote from the wastewater treatment system 300. As such, the present invention is adaptable for such remote uses. As can be seen in FIG. 6, the wastewater treatment system 300 includes a pretreatment tank 304, an aeration tank 306 and a pump tank 308. The pretreatment tank 304 has a configuration similar to that described by the pretreatment tank 244 of FIG. 5. The aeration tank 306 includes suitable aerators 310 and 312 which extend upwardly toward the riser opening 314 and to a T-shaped connector 316 which connects to the air discharge line 318 associated with pump 320. A cover 322 extends over the riser opening 314. A vent 324 is placed onto the cover 322 so as to allow the escape of gases therefrom.

As can be seen in FIG. 6, the top 326 of the aeration tank 306 lacks the platform 56, the base 58 and the cover 82 of the original embodiment of the present invention. A liquid level switch 328 is connected to an electrical line 330 which extends along the outlet pipe 332 of the aeration tank 306. Electrical line 330 will pass through a small conduit 334 extending between the aeration tank 306 and the pump tank 308. The electrical line 330 will extend so as to connect with junction box 336. The outlet pipe 332 will extend into the interior of the pump tank 308 so as to fluidically communicate with the chlorinator 338 therein.

The pump tank 308 includes a bottom suction pump 340 which includes a discharge pipe 342 extending upwardly therefrom. The discharge pipe 342 includes a vertical portion 344 and a horizontal portion 346. A union 348 connects the horizontal portion 346 with the vertical portion 344. A low level float switch 350 is positioned adjacent to the bottom 352 of the pump tank 308. The low level float switch 350 is connected by electrical line 354 to the junction box 336. A high level float switch 356 is connected by an electrical line 358 to the junction box 336. The junction box 336 is located interior of the riser 360 of the pump tank 308. A cover 362 will cover this riser opening so as to prevent exposure of the junction box 336 to the ambient elements.

In FIG. 6, it can be seen that the junction box 336 includes suitable compression fittings which create a liquid- and gas-tight seal between the exterior of the electrical lines 330, 354, 358 and 364 (connected to the suction pump 340). As such, although the junction box 336 is located within the interior of the pump tank 308, gas and liquid intrusion is prevented through the use of such compressive fittings.

As will be described hereinafter, each of the electrical lines 330, 354, 358, and 364 will be connected to terminals located on the interior of the junction box 336. From these terminals, wires will extend through the interior of a conduit 370. Conduit 370 extends outwardly of the pump tank 308 and will pass to a T-enclosure 372 associated with the control center 302. A power supply line 375 will also extend to the T-enclosure 372. These wires can then extend upwardly to the electrical controller 374 within the cover 376 of the control center 302. The pump 320 and the electrical controller 374 are mounted on a base 378. Base 378 has a configuration similar to the base 58 described in the original embodiment of the present invention.

In this form of the present invention, the operations control center 302 can be located at a remote location. In order to properly install the wastewater treatment system 300, it will be necessary to extend the air discharge pipe 318 from the remote location to the T-fitting 316 associated with the aerators 310 and 312. Additionally, it will be necessary to extend the conduit 370 from the T-enclosure 372 to the junction box 336. As such, this embodiment of the present invention will require greater installation requirements than with the preferred embodiment, as shown in FIG. 5.

Figure 7:
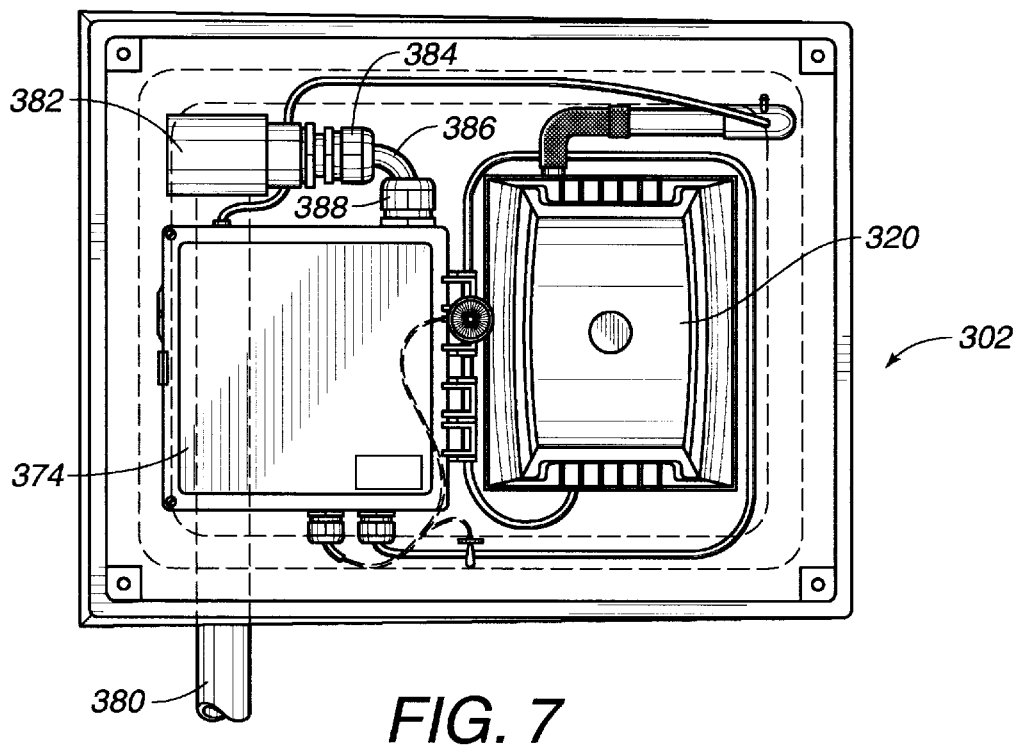
FIG. 7 is a plan view of the operations control center as used in this alternative embodiment of the present invention.

FIG. 7 shows the interior of the operations control center 302 in this embodiment of the present invention. The operations control center 302 includes pump 320 and the electrical controller 374. The wires from the junction box 336 will extend through the interior of a conduit 380. Conduit 380 is suitable for connection to the T-enclosure 372. Additionally, the electrical supply line 375 will also extend through the conduit 380. The wires and the power supply line can be connected to suitable terminals within connector box 382. A compression fitting 384 is connected to the connector box 382 so as to establish a compressive fluid-tight seal between the interior of the connector box 382 and the exterior surface of a multi-line cable 386. Another compression fitting 388 is secured to an opening in the box of the electrical controller 374 so as to establish another fluid-tight seal therebetween. The multi-line cable 386 will then expose its various connection ends within the interior of the electrical controller 374 so as to be suitably connected to desired terminals.

Figure 8:
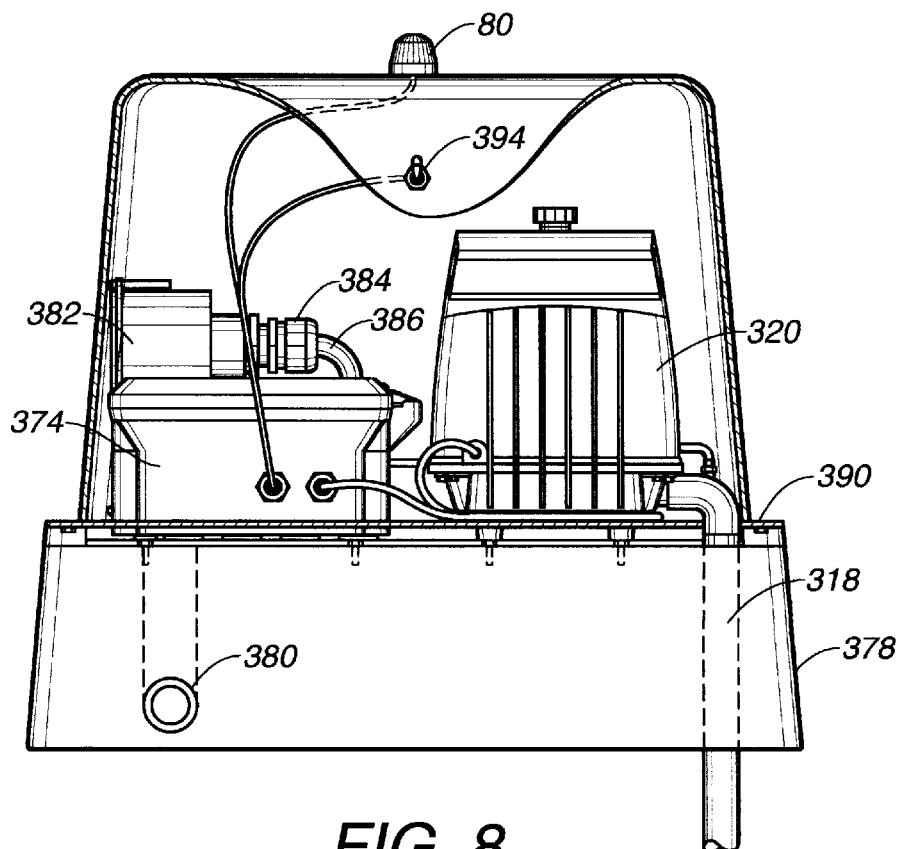
FIG. 8 is a side, partially cross-sectional view, of the operations control center as used in this alternative embodiment of the present invention.

FIG. 8 further shows this arrangement in which the wires and the electrical supply line extend through the conduit 380 up to the connector box 382. The compression fitting 384 is secured to the connector box 382 in such a manner so as to allow the multi-line cable 386 to extend downwardly therefrom and to be received by the electrical controller 374. The pump 320 receives power from the electrical controller 374 in the manner of the original embodiment. An air discharge line 318 will extend from the pump 320 to the aerators within the aeration tank 306. The electrical controller 370 and the pump 320 are mounted to a top surface 390 on the base 378. The operation of the warning light 392 and the test/silence/normal switch 394 will be in the manner described in association with the original embodiment of the present invention.

Figure 9:
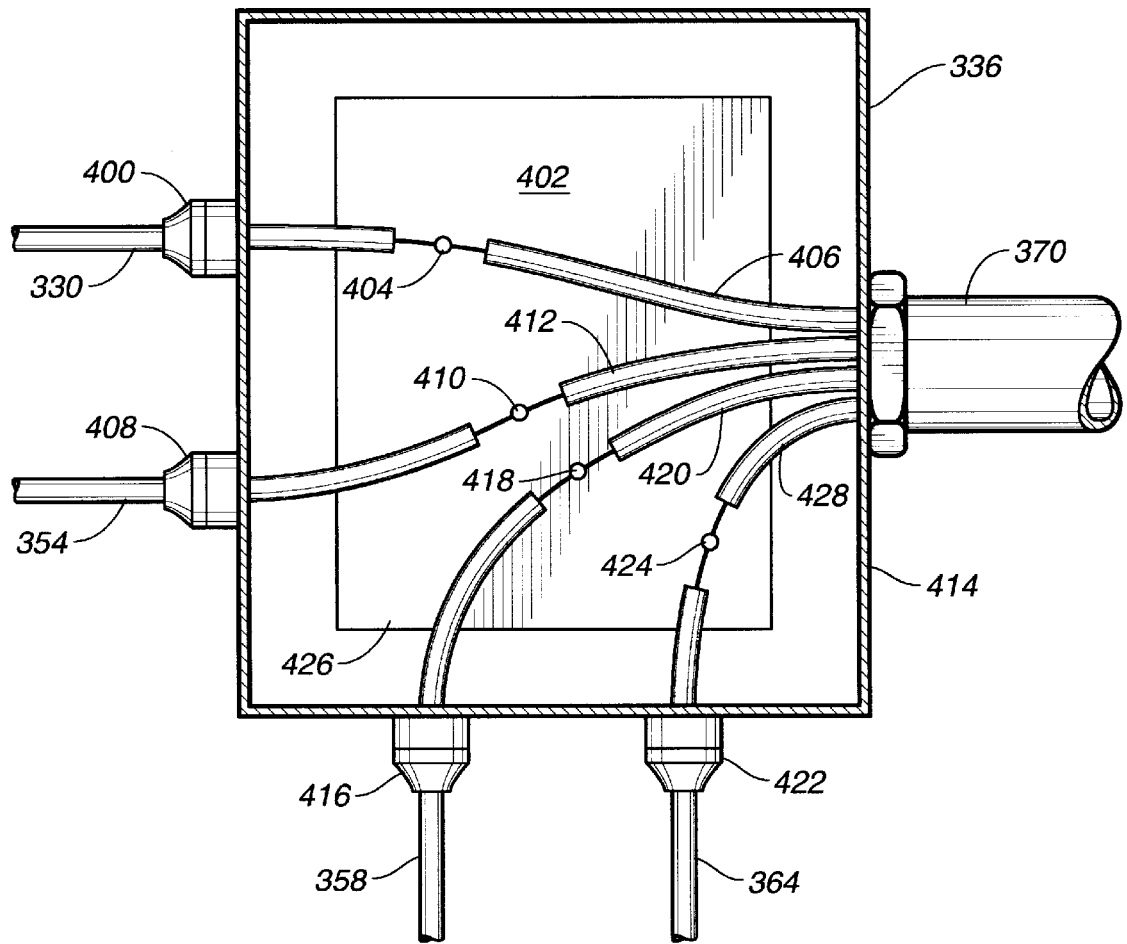
FIG. 9 is a detailed interior view of the junction box as used in this alternative embodiment of the present invention.

FIG. 9 shows an illustration of the interior of the junction box 336. As can be seen, the electrical line 330 extends through a compression fitting 400 so as to emerge on the interior 402 of the junction box 306. The electrical line 330 is connected to a terminal 404. The wire 406 is also connected to terminal 404 and extends into the conduit 370 affixed to a wall of the junction box 336. The electrical line 354 also extends in to compression fitting 408 and into the interior 402 of the junction box 336. Electrical line 354 is connected to terminal 410. A wire 412 extends from terminal 410 through a wall 414 of the junction box 336 and into the conduit 370. Similarly, electrical line 358 passes through compression fitting 416 and into the interior 402 of the junction box 336. Electrical line 358 connects to terminal 418. Wire 420 will then extend into the conduit 370. Finally, electrical line 364 will pass through the compression fitting 422 and into the interior 402 of the junction box 336. Electrical line 364 will connect to terminal 424 on junction panel 426. Wire 428 will then extend into the conduit 370. The junction box 336 can be suitably sealed closed so that liquid and gas intrusion can be prevented.

Since it is possible for gases to actually enter the interior of the junction box 336, the present invention avoids corrosion and damage to the electrical control 336 by preventing further gas passage through the use of the compression fittings 384 and 388 prior to the electrical controller 374. As such, the present invention provides double safeguards in preventing corrosion of the important equipment associated with the control center 302 of the present invention.

With reference to FIG. 6, it can further be seen that this alternative embodiment of the present invention can be configured as a single unit. A first connector band 430 extends around the exterior of the tanks 304, 306 and 308. A second connector band 432 also extends around the exterior surfaces of these tanks. The bands 430 and 432 are arrange in spaced parallel relationship. A saddle member 434 is positioned between the wall of the pump tank 308 and the wall of the aeration tank 306. Another saddle member 436 is positioned between the wall of the aeration tank 306 and the wall of the pretreatment tank 304. A suitable spacer member 438 is placed on the inlet to the aeration tank 306 so as to provide proper spacing between the pretreatment tank 304 and the aeration tank 306. Another spacer 440 is provided on the outlet 332 of the aeration tank 306 so as to provide proper spacing for the upper sides of the aeration tank 306 with respect to the pump tank 308. In this arrangement, the tanks 304, 306 and 308 can be installed by the use of a single excavation. The operations control center 302 can then be connected fluidically and electrically, as described herein previously. The control center 302 can be placed in a remote location, as desired.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wastewater treatment system comprising:
   an aeration tank having a wall defining an interior volume, said aeration tank having at least one aeration mechanism therein, said aeration tank having a fluid inlet and a fluid outlet, said aeration tank having a platform formed atop thereof; and
   an electrical controller being electrically connected to a power supply, said electrical controller electrically connected to said aeration mechanism, said electrical controller having a plurality of electrical lines extending interior of said aeration tank, at least one of said electrical lines extending outwardly of said aeration tank through the wall thereof, said controller being fluidically isolated from an interior of said aeration tank, said electrical controller being mounted on a base affixed atop said platform, said plurality of electrical lines extending through said base and said platform, each of said plurality of electrical lines extending through a respective conduit formed in an opening of said base, and each said conduit being sealingly received by an respective opening in said platform.

2. The system of claim 1, said conduit having a compression fitting affixed thereto, each of said electrical lines extending through a respective compression fitting to said electrical controller, said compression fitting being in fluid-tight relationship with an exterior surface of a respective electrical line.

3. The system of claim 2, said conduit having a coupler having one end affixed over an end of said conduit opposite said platform, said coupler being threadedly attached to said compression fitting.

4. The system of claim 1, at least one of said plurality of electrical lines being connected to a liquid level switch within an interior of said aeration tank.

5. The system of claim 1, said plurality of electrical lines being fluid-tight insulated electrical cables.

6. A wastewater treatment system comprising:
   an aeration tank having a wall defining an interior volume, said aeration tank having at least one aeration mechanism therein, said aeration tank having a fluid inlet and a fluid outlet; and
   an electrical controller being electrically connected to a power supply, said electrical controller electrically connected to said aeration mechanism, said electrical controller having a plurality of electrical lines extending interior of said aeration tank, at least one of said electrical lines extending outwardly of said aeration tank through the wall thereof, said controller being fluidically isolated from an interior of said aeration tank, said aeration tank having a platform formed atop thereof, said electrical controller being mounted on a base affixed atop said platform, said plurality of electrical lines extending through said base and said platform;

an air pump mounted on said base, said air pump having an air discharge line extending through an opening in said base and through a hole formed in said platform, said platform hole vertically aligned with said base opening, said air discharge line sealingly received by said hole in said platform, said air discharge line extending interior of said aeration tank to an aerator of said aeration mechanism; and a single cover removably affixed over said electrical controller and said air pump on said base.

7. The system of claim 6, said plurality of electrical lines being affixed to and extending along at least a portion of a length of said air discharge line.

8. A wastewater treatment system comprising:

an aeration tank having a wall defining an interior volume, said aeration tank having at least one aeration mechanism therein, said aeration tank having a fluid inlet and a fluid outlet; and an electrical controller being electrically connected to a power supply, said electrical controller electrically connected to said aeration mechanism, said electrical controller having a plurality of electrical lines extending interior of said aeration tank, at least one of said electrical lines extending outwardly of said aeration tank through the wall thereof, said controller being fluidically isolated from an interior of said aeration tank;

a pump tank having an inlet in fluid communication with said outlet of said aeration tank, said pump tank having a suction pump therein, said suction pump connected to a discharge pipe extending outwardly of said pump tank, said pump tank having a low level float switch and a high level float switch, one of said plurality of electrical lines being connected to said suction pump, another of said plurality of electrical lines being connected to said low level float switch, another of said plurality of electrical lines connected to said high level float switch; and a connector securing said pump tank to said aeration tank in fixed spaced relationship when said pump tank and said aeration tank are in an upright position, said connector comprising:

a spacing means between said tanks and a band extending around and against a portion of said wall of both said aeration tank and said pump tank.

9. The system of claim 8, said electrical lines to said suction pump and to said high level float switch and to said low level float switch extending through a conduit between said aeration tank and said pump tank.

10. The system of claim 8, said discharge pipe having a vertical portion and a horizontal portion, said horizontal portion extending outwardly of said pump tank, said horizontal portion being detachably connected to said vertical portion.

11. The system of claim 10, said electrical lines to said suction pump and to said high level float switch and to said low level float switch extending along and detachably affixed to said vertical portion of said discharge pipe.

12. The system of claim 8, said spacing means of said connector further comprising:

a saddle member interposed between said wall of said aeration tank and said wall of said pump tank; and a spacer member affixed over one of said outlet of said aeration tank and said inlet of said pump tank so as to be interposed between said wall of said aeration tank and said wall of said pump tank.

13. The system of claim 8, further comprising:

a pretreatment tank having an outlet connected to said inlet of said aeration tank, said connector securing said pretreatment tank to said aeration tank in fixed spaced relationship.

\* \* \* \* \*